(12) United States Patent
Sosanya et al.

(10) Patent No.: US 12,737,987 B2
(45) **Date of Patent: *Sep. 15, 2026**

(54) DYNAMIC THREE-DIMENSIONAL SURFACE SKETCHING

(71) Applicant: Wacom Co., Ltd., Saitama (JP)

(72) Inventors: Oluwaseyi Sosanya, London (GB); Daniela Paredes-Fuentes, London (GB); Daniel Thomas, London (GB)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/192,164

(22) Filed: Apr. 28, 2025

(65) Prior Publication Data

US 2025/0259397 A1 Aug. 14, 2025

Related U.S. Application Data

(63) Continuation of application No. 18/148,340, filed on Dec. 29, 2022, now Pat. No. 12,307,601, which is a (Continued)

(51) Int. Cl.
*G06T 17/30* (2006.01)
*G02B 26/10* (2006.01)
(Continued)

(52) U.S. Cl.
CPC .............. *G06T 17/30* (2013.01); *G02B 26/10* (2013.01); *G02B 27/017* (2013.01);
(Continued)

(58) Field of Classification Search
CPC ............ G02B 27/0172; G02B 27/0179; G02B 27/017; G02B 30/54; G02B 26/10;
(Continued)

(56) References Cited

U.S. PATENT DOCUMENTS

2003/0214490 A1 11/2003 Cool
2004/0196267 A1* 10/2004 Kawai ................ G06F 3/04842 345/173

(Continued)

FOREIGN PATENT DOCUMENTS

WO 2013114453 A1 8/2013

OTHER PUBLICATIONS

Extended European Search Report, dated Nov. 3, 2023, for European Patent Application No. 21831515.8-1224. (10 pages).

(Continued)

*Primary Examiner* — Deeprose Subedi
(74) *Attorney, Agent, or Firm* — Seed Intellectual Property Law Group LLP

(57) ABSTRACT

A method and system for three-dimensional (3D) surface sketching are provided. A 3D scanner scans an outer surface of a physical object and outputs data representative of the outer surface. A processor generates, based on the received data, a 3D model of the object and outputs a 3D rendering of the object. A display displays the 3D rendering of the object. An input device physically traces over a portion of the outer surface of the object and a tracking device tracks a positioning of the input device as the input device physically traces over the portion of the outer surface of the object. The processor receives data representative of at least one spatial position of the input device, augments the 3D rendering of the object based at least in part on the data and outputs the augmented 3D rendering to the display.

14 Claims, 6 Drawing Sheets

Related U.S. Application Data continuation of application No. PCT/IB2021/055651, filed on Jun. 25, 2021, which is a continuation of application No. 16/918,845, filed on Jul. 1, 2020, now abandoned.

(51) Int. Cl.

| | |
|---|---|
| ***G02B 27/01*** | (2006.01) |
| ***G02B 30/54*** | (2020.01) |
| ***G06F 3/0346*** | (2013.01) |
| ***G06F 3/0354*** | (2013.01) |
| ***G06F 3/038*** | (2013.01) |
| ***G06T 15/00*** | (2011.01) |
| ***G06T 17/20*** | (2006.01) |
| ***G06T 19/20*** | (2011.01) |

(52) U.S. Cl.

CPC ..... *G02B 27/0172* (2013.01); *G02B 27/0179* (2013.01); *G02B 30/54* (2020.01); *G06F 3/0346* (2013.01); *G06F 3/03545* (2013.01); *G06F 3/0383* (2013.01); *G06T 15/005* (2013.01); *G06T 17/20* (2013.01); *G06T 17/205* (2013.01); *G06T 19/20* (2013.01); *G02B 2027/014* (2013.01); *G02B 2027/0141* (2013.01); *G06T 2219/2021* (2013.01)

(58) Field of Classification Search

CPC ...... G02B 2027/0141; G02B 2027/014; G06T 15/005; G06T 17/205; G06T 17/30; G06T 17/20; G06T 19/20; G06T 2215/16; G06T 2219/2021; G06F 3/0383; G06F 3/0484; G06F 3/011; G06F 3/03545; G06F 3/0346; G06F 3/04815

See application file for complete search history.

(56) References Cited

U.S. PATENT DOCUMENTS

| | | | | |
|---|---|---|---|---|
| 2013/0300735 | A1 | 11/2013 | Schmidt | |
| 2016/0147408 | A1 | 5/2016 | Bevis et al. | |
| 2018/0018057 | A1 * | 1/2018 | Bushnell | G06F 3/0412 |
| 2018/0081455 | A1 * | 3/2018 | Huston | G06F 3/03545 |
| 2019/0369752 | A1 | 12/2019 | Ikeda et al. | |
| 2020/0211243 | A1 * | 7/2020 | Ulusoy | G06T 11/60 |

OTHER PUBLICATIONS

International Search Report, mailed Sep. 14, 2021, for International Patent Application No. PCT/IB2021/055651. (4 pages).

Yamamoto et al., "Multiplexing of Real Objects in a Mixed Reality Space—Cooperative Work Support in which Multiple Workers Each Occupy Their Own Duplicated Real Object," Keio University, Gazou Labo, Feb. 2009. (with English translation) (16 pages).

* cited by examiner

DYNAMIC THREE-DIMENSIONAL SURFACE SKETCHING

BACKGROUND

Technical Field

This application is directed to generating three-dimensional (3D) rendering of a physical object and annotating and refining the 3D rendering by physically tracing an input device over the physical object. This application is also directed to distance measurement of a curve traced by the input device.

Description of the Related Art

In many industries, including the automotive industry, physical models, such as clay models, are used to model automobile designs and physically illustrate design features of an automobile. Refining and augmenting a physical model is an important task in designing cars as well as other industrial or consumer products. During the industrial design process, designer and 3D modelers shape the physical model with tools and tape-mark changes to the physical model. However, physically shaping the physical model is time consuming and oftentimes not easily reversible as the physical model may need to be patched in order to reverse a change made to the model.

Accordingly, a method and apparatus for rendering a 3D model of a physical object and augmenting the 3D model by sketching on the 3D model and digitally or virtually viewing the augmented 3D model is desired.

BRIEF SUMMARY

In an embodiment, a system includes a three-dimensional (3D) scanner configured to scan an outer surface of a physical object, and output data representative of the outer surface of the object. In an embodiment, the system includes a processor configured to receive the data representative of the outer surface of the object, and generate, based on the received data, a 3D model of the object, and output a 3D rendering of the object based on the generated 3D model. In an embodiment, the system includes a display configured to receive the 3D rendering of the object, and display the 3D rendering of the object. The system includes an input device operable to physically trace over at least one portion of the outer surface of the object and a tracking device configured to track a positioning of the input device as the input device physically traces over the at least one portion of the outer surface of the object, and output data representative of at least one spatial position of the input device as the input device traces over the object. The processor is configured to receive the data representative of the at least one spatial position of the input device, augment the 3D rendering of the object based at least in part on the data representative of the at least one spatial position of the input device, and in response to augmenting the 3D rendering of the object, output the augmented 3D rendering of the object to the display. In an embodiment, the display is configured to display the augmented 3D rendering of the object.

In an embodiment, the processor is configured to augment the 3D rendering of the object by at least identifying, based on the data representative of the at least one spatial position of the input device, one or more curves having one or more respective positions in space relative to the outer surface of the object, and superposing the one or more curves on the 3D rendering of the object at one or more rendering positions corresponding to the one or more positions in space relative to the outer surface of the object, respectively.

In an embodiment, the input device is pressure sensitive and configured to sense a pressure applied to the input device as the input device physically traces over the at least one portion of the outer surface of the object, and output data representative of the pressure. The processor is configured to determine respective one or more widths of the one or more curves based at least in part on the pressure applied to the input device as the input device physically traces over the at least one portion of the outer surface of the object to form the one or more curves and superpose, on the 3D rendering of the object, the one or more curves having the respective one or more widths.

In an embodiment, the input device includes a pressure-sensitive tip operable to sense the pressure applied to the input device as the input device physically traces over the at least one portion of the outer surface of the object. In an embodiment, the input device includes a first control input operative to receive one or more respective width indications of the one or more curves. The input device is configured to output data representative of one or more respective width indications to the processor, and the processor is configured to receive the data representative of one or more respective width indications, determine respective one or more widths of the one or more curves based the data representative of one or more respective width indications, and superpose, on the 3D rendering of the object, the one or more curves having the respective one or more widths. In an embodiment, the display is a head-mounted display configured to display the 3D rendering of the object superposed on the physical object that otherwise is visually visible through the head-mounted display.

In an embodiment, a system includes a three-dimensional (3D) scanner configured to scan an outer surface of a physical object, and output data representative of the outer surface of the object. The system includes a processor configured to receive the data representative of the outer surface of the object, generate, based on the received data, a 3D model of the object, and output a 3D rendering of the object based on the generated 3D model. In an embodiment, the system includes a display configured to receive the 3D rendering of the object, and display the 3D rendering of the object and an input device operable to physically trace over at least one portion of the outer surface of the object. The system includes a tracking device configured to track a positioning of the input device as the input device traces over the at least one portion of the outer surface of the object, and output data representative of at least one position of the input device in 3D space as the input device traces over the outer surface of the object. The processor is configured to receive the data representative of the at least one position of the input device, modify the 3D model of the object based at least in part on the data representative of the at least one position of the input device, generate an updated 3D rendering of the object based on the modified 3D model, and in response to generating the updated 3D rendering of the object, output the updated 3D rendering of the object to the display. In an embodiment, the display is configured to display the updated 3D rendering of the object.

In an embodiment, the processor is configured to generate the 3D model of the object by generating a polygon mesh that includes a plurality of vertices and a plurality of edges. In an embodiment, the processor is configured to modify the 3D model of the object by at least changing a position of a vertex of the plurality of vertices or an edge of the plurality of edges to correspond to the at least one position of the input device in 3D space. In an embodiment, the processor is configured to modify the 3D model of the object by at least adding, to the plurality of vertices, a first vertex having a position in space that corresponds to the at least one position of the input device in 3D space. In an embodiment, the processor is configured to modify the 3D model of the object by at least removing, from the plurality of vertices, a second vertex having a position that is closest in 3D space to the position of the first vertex. In an embodiment, the display is a head-mounted display configured to display the 3D rendering of the object superposed on the physical object that otherwise is visually visible through the head-mounted display, and further configured to display the updated 3D rendering of the object superposed on the physical object that otherwise is visually visible through the head-mounted display.

In an embodiment, a system includes a three-dimensional (3D) scanner configured to scan an outer surface of a physical object, and output data representative of the outer surface of the object. In an embodiment, the system includes a processor configured to receive the data representative of the outer surface of the object, and generate, based on the received data, a 3D model of the object, and output a 3D rendering of the object based on the generated 3D model. In an embodiment, the system includes a display configured to receive the 3D rendering of the object, and display the 3D rendering of the object. The system includes an input device operable to physically trace over at least one portion of the outer surface of the object, and a tracking device configured to track a positioning of the input device as the input device traces over the at least one portion of the outer surface of the object, and output data representative of at least two positions of the input device as the input device traces over the object. The processor is configured to receive the data representative of the at least two positions, determine a distance between the at least two positions, and output data representative of the distance.

The processor is configured to identify a curve based on data representative of positions of the input device between the at least two positions, and determine the distance between the at least two positions along the identified curve. The display is configured to receive the data representative of the distance, and display the distance on the display. The input device includes a control input operative to receive a selection of a first mode of operation of a plurality of modes of operation of the input device and output data indicative of the first mode of operation.

In an embodiment, the processor is configured to receive the data indicative of the first mode of operation, and in response to receiving the data indicative of the first mode of operation, determine the distance between the at least two positions, and output the data representative of the distance. In an embodiment, the input device receives, via the control input, a selection of a second mode of operation of the plurality of modes of operation of the input device and output data indicative of the second mode of operation. The processor is configured to receive the data indicative of the second mode of operation, and in response to receiving the data indicative of the second mode of operation, augment the 3D rendering of the object based on positioning information received from the tracking device tracking the input device as the input device traces over at least one portion of the outer surface of the object. The processor is configured to receive the data indicative of the second mode of operation, and in response to receiving the data indicative of the second mode of operation, modify the 3D model of the object based on positioning information received from the tracking device tracking the input device as the input device traces over at least one portion of the outer surface of the object, and generate an updated 3D rendering of the object based on the modified 3D model.

DETAILED DESCRIPTION

Figure 1:
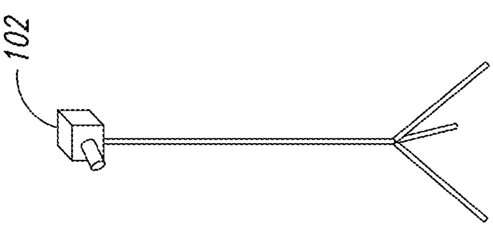
FIG. 1 shows a three-dimensional (3D) scanner scanning a physical object.
Figure 1:
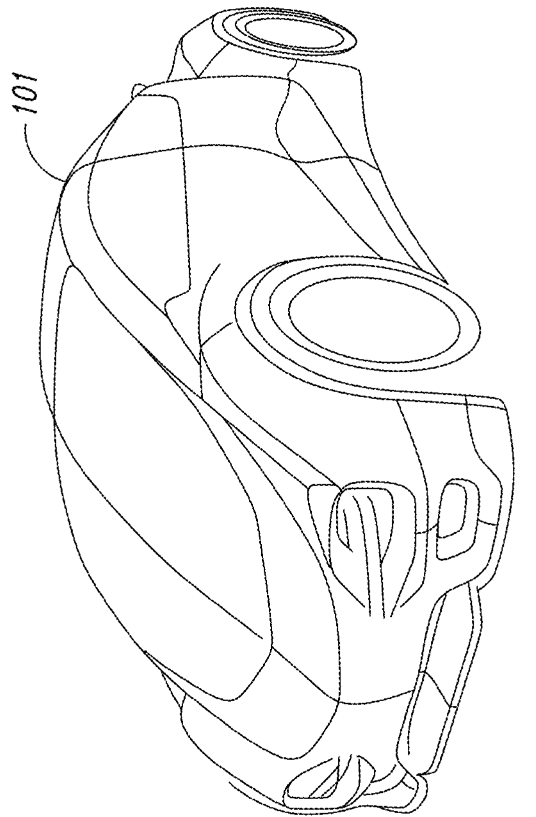
Figure 1:
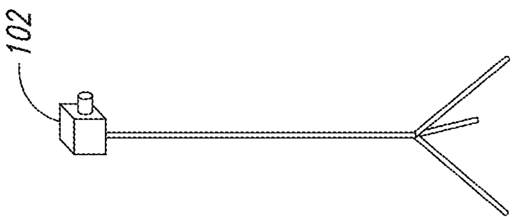

FIG. 1 shows a three-dimensional (3D) scanner 102 scanning a physical object 101. The 3D scanner 102 may be any device configured to scan the physical object 101 or an outer surface thereof for generating a three-dimensional model of the physical object 101. The 3D scanner 102 may be a non-contact or a contact scanner. Further, the 3D scanner 102 may be an active scanner or a non-active scanner. The 3D scanner 102 may use any technique for scanning the object, such as time-of-flight (ToF) or triangulation.

The 3D scanner 102 may be a ToF 3D laser scanner. The 3D scanner 102 may be an active scanner that uses laser light to probe the physical object 101. The 3D scanner 102 may be a stereoscopic scanner. The 3D scanner 102 may include a ToF laser range finder. The laser range finder may identify a distance between the 3D scanner 102 and the surface of the physical object 101 based on the timing of a round-trip time of a pulse of light emitted by the 3D scanner 102. The 3D scanner 102 emits a laser pulse, detects a reflection of the laser pulse reflected by the surface of the physical object 101 and determines a duration of time (round trip time) between a time instant when the laser pulse is emitted and a time instant when the reflection of the laser pulse is detected. The 3D scanner 102 determines a distance between the 3D scanner 102 and the surface of the physical object 101 based on the determined time and the speed of light.

The 3D scanner 102 may directionally emit the laser pulse to scan the physical object 101. The 3D scanner 102 accordingly scans the physical object 101 from multiple views. The ToF laser range finder may scan an entire field of view one point at a time and may change its direction of view to scan different points of the outer surface of the object 101. The direction of view may be changed either by rotating the range finder or using a system of rotating mirrors, among others.

Figure 2:
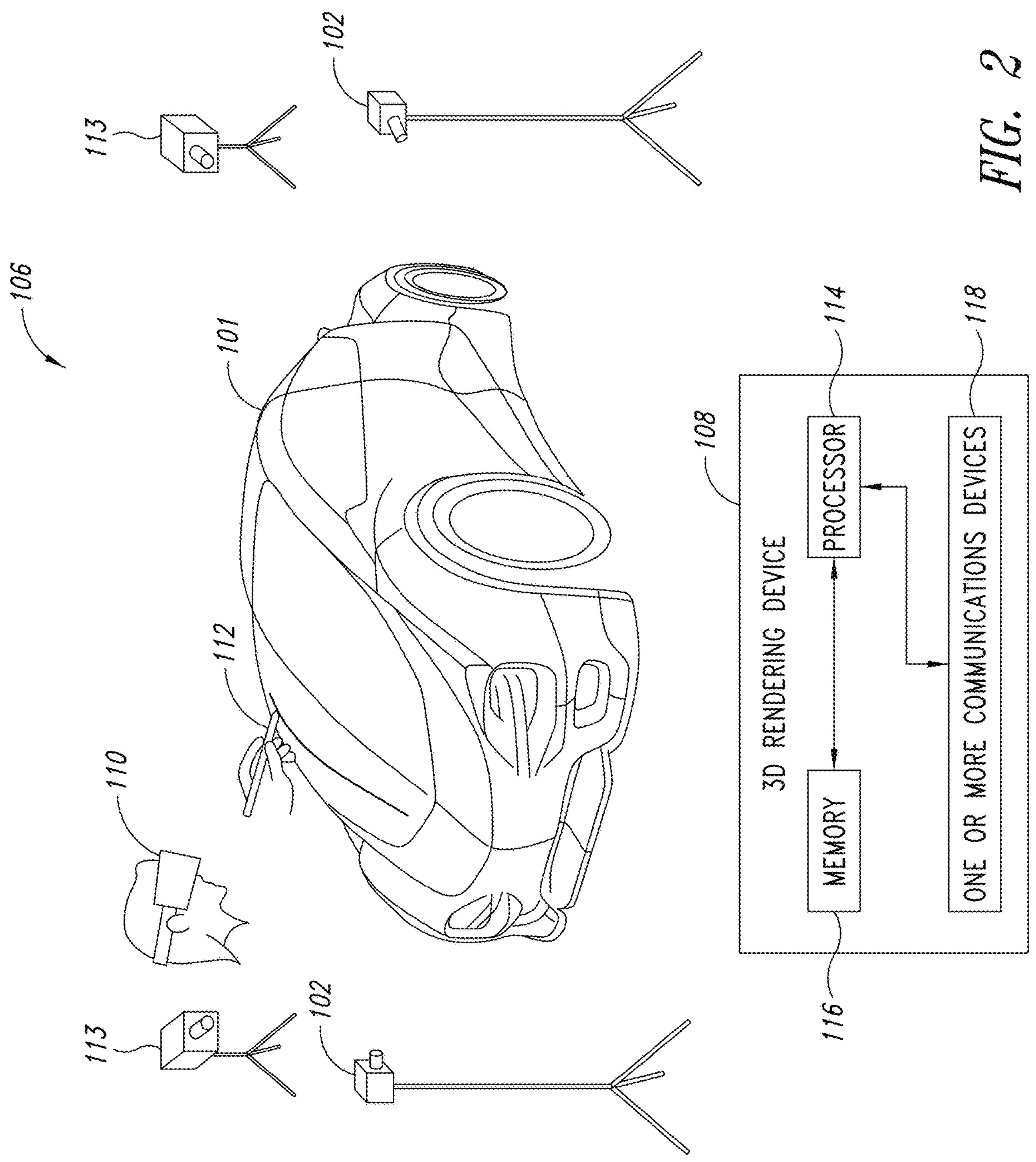
FIG. 2 shows a 3D rendering system.

FIG. 2 shows a 3D rendering system 106. The system 106 includes the 3D scanner 102, a 3D rendering device 108 (shown in block diagram form), a display 110 (shown pictorially for example as a head-mounted display), an input device 112 and a tracking device 113 for the input device 112. The 3D rendering device 108 includes a processor 114, memory 116 and one or more communication devices 118. The memory 116 and the one or more communication devices 118 are communicatively coupled to the processor 114. The 3D rendering device 108 is communicatively coupled to the 3D scanner 102, the display 110, the input device 112 and the tracking device 113.

The processor 114 may be any type of computational device configured to perform the operations described herein. The processor 114 may be a graphics processing unit (GPU) or a central processing unit (CPU), among others. The processor 114 may also be a controller, a microcontroller or a microprocessor, among others. The memory 116 may be any type of storage device configured to store data. The data may be graphics data (such as a 3D rendering of the surface of the physical object 101) or the data may be executable instructions that, when executed by the processor 114, cause the processor to perform the operations described herein.

The one or more communication devices 118 may be any type of communication devices configured to traffic or exchange data with other communication devices. A communication device 118 may be a wireless or a wired communication device and may be a modem or a transceiver, among others. A communication device 118 may receive data from or transmit data to another communication device. Although not shown in FIG. 2, other communication devices may be part of the 3D scanner 102, the display 110, the input device 112 and/or the tracking device 113. The one or more communication devices, which may include one or multiple communication devices, may communicate using any type of protocol associated with a respective communication device. The protocol may be an Institute of Electrical and Electronics Engineers (IEEE) 802.11 protocol, a Bluetooth protocol, a universal serial bus (USB) protocol or cellular communications protocol, such as a Third Generation Partnership Project (3GPP) Long-Term Evolution (LTE) protocol, among others.

It is noted that the 3D rendering device 108 may be a computer, tablet or smartphone, among others. The 3D rendering device 108 may be independent of the display 110 or the tracking device 102. However, in alternative embodiments the 3D rendering device 108 may be part of the display 110 or the tracking device 102 or the operations performed by the 3D rendering device 108 may instead be performed by the display 110 and a processor, memory or one or more communication devices thereof.

The 3D rendering device 108 receives, over the one or more communication devices 118, a signal carrying data representative of the scanned physical object 101. The signal may be modulated and encoded in accordance with a respective modulation and encoding of the communication protocol used by the one or more communication devices 118.

The one or more communication devices 118 demodulates and decodes the signal and outputs the data representative of the scanned physical object 101 to the processor 114. The processor 114 evaluates the data representative of the scanned physical object 101. The processor 114 generates a 3D model of the physical object 101 based on the data representative of the physical object 101. The 3D model of the physical object 101 may include a polygon mesh that includes a plurality of vertices and a plurality of edges. The polygon mesh may also include a plurality of surfaces. Each surface may be between three or more respective edges of the plurality of edges. A vertex of the plurality of vertices has a position in space that corresponds to a position in space of a point on the outer surface of the physical object 101. The plurality of vertices, the plurality of edges and the plurality of surfaces virtually (and digitally) represent the scanned physical object 101. The processor 114 stores the 3D model of the physical object 101 in the memory 116. The processor 114 causes the 3D model of the physical object 101 to be output, via the one or more communication devices 118, to the display 110.

The display 110 may be a head-mounted display (HMD). As a head-mounted display, the display 110 may be a virtual reality display or an augmented reality display. As an augmented reality display, the display 110 may be transparent or semi-transparent. As such, a viewer viewing the physical object 101 through the display 110 sees the physical object 101 by virtue of the display's 110 transparent properties. Using the 3D model of the object, the display 110 may superpose a 3D rendering of the physical object 101 over the physical object 101 as the physical object 101 is transparently visible through the display 101. Accordingly, in such embodiment, the viewer sees the 3D rendering of the physical object 101 overlaid on the physical object 101.

The viewer or user may use the input device 112 to annotate, augment, refine, or change (collectively "augment") the 3D rendering of the physical object. The user may use the input device 112 to augment the 3D rendering of the physical object by drawing one or more curves in general or any other shape on the 3D rendering. In this regard, the user may trace the input device or a tip thereof in 3-dimensional space over at least a portion of the physical object 101. The tracking device 113 tracks a position of the input device 112 in the 3-dimensional space and outputs data representative of the position to the 3D rendering device 108. The 3D rendering device 108 receives the data representative of the position of the input device 112 and generates an augmented 3D rendering of the physical object based on the data representing the tracked position of the input device 112. As will be appreciated from the description herein, the augmented 3D rendering of the physical object may include designs and features that appear virtually on or in relation to a surface of the physical object but do not otherwise appear in the actual 3-dimensional space of the physical object.

Figure 3:
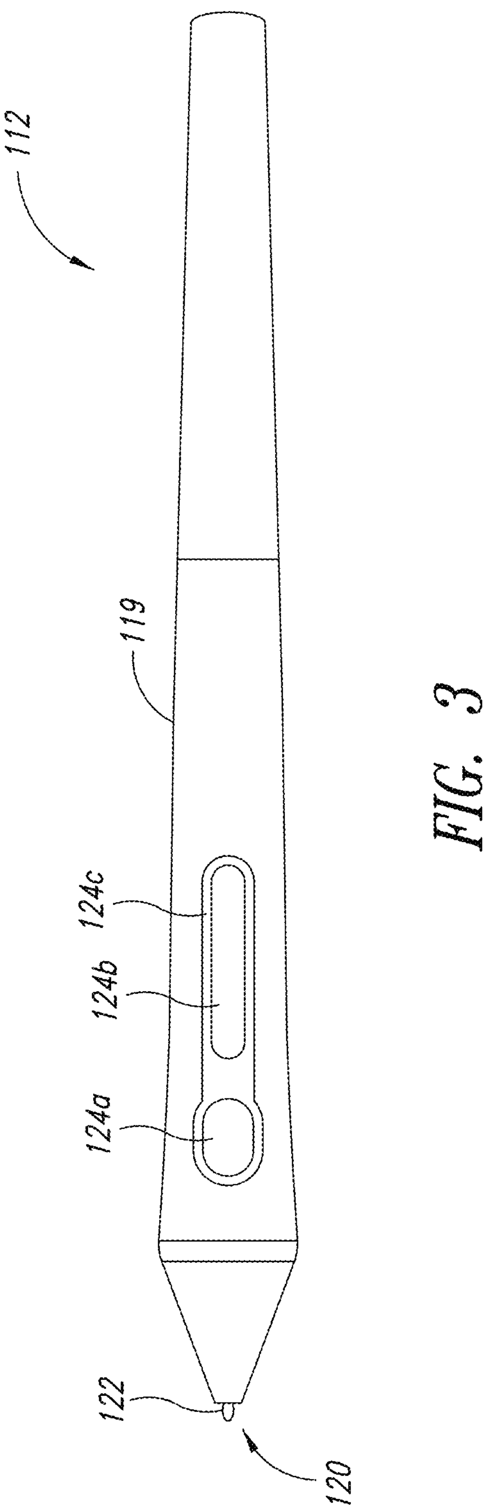
FIG. 3 shows an input device in accordance with an embodiment of the present disclosure.

FIG. 3 shows an example of the input device 112 in accordance with an embodiment. The input device 112 includes a housing 119, a tip 120, a marker 122 and a plurality of control inputs **124*a*, 124*b*, 124*c*. The tip 120 may be pressure-sensitive. The marker 122 may be positioned on the tip 120 of the input device 112. In other embodiments, the marker 122 may be positioned elsewhere on the input device 112. The marker 122 may be a passive or an active marker that is used to track and determine the position of the tip 120. For example, the marker 122 may be a reflective coating that reflects light. Alternatively or in addition, the marker 122 may be a light-emitting diode (LED) that actively illuminates light for tracking the tip 120 of the input device 112. In various embodiments, the marker 122 may be a strobe light that emits light having a specified wavelength or signature. In various embodiments, the input device 112 may be marker-less, whereby a position of the tip 120** or another part of the input device may be tracked based on a shape or other property thereof.

Referring back to FIG. 2, the tracking device 113 tracks the spatial positions of the input device 112 or the marker 122 thereof as the input device 112 moves through 3-dimensional space. The tracking device 113 determines a spatial position of the marker 122 and outputs data representative of the position to the 3D rendering device 108. In at least one embodiment, the tracking device 113 may include one or more cameras, such as motion capture cameras. The one or more cameras may capture images of the marker 122 and determine the position of the marker and consequently the tip 120 and input device 112 based on the captured images.

The tracking device 113 may include a communication device (not shown). The tracking device 113 may send a signal, over the communication device, including the data representative of the spatial position of the input device 112. The 3D rendering device 108 receives the signal, over the one or more communication devices 118, and outputs the data representative of the spatial position to the processor 114. The processor 114 identifies the position of the input device 112 or the marker 122 based on the received position data. The processor 114 thereafter augments the 3D rendering of the physical object based on the received position data.

For example, the user may physically trace over an outer surface of the physical object 101 with the input device 114 or the tip 120 thereof to draw a line or, generally, a curve. Thus, the input device 114 may be used to sketch (or chart) over the 3D rendering of the physical object. As the user traces over the outer surface of the physical object 101, the tracking device 113 tracks the spatial position of the tip 122 and outputs data representative of the position to the 3D rendering device 108. The 3D rendering device 108 augments the 3D rendering of the physical object by adding a corresponding curve to the 3D rendering of the physical object. The curve may be a collection of points connected with one another and having positions in space corresponding to the positions of the tip detected by the tracking device 113. The 3D rendering device 108 superposes the curve onto the 3D rendering of the physical object. The 3D rendering device 108 thereafter generates an augmented 3D rendering of the physical object. The augmented 3D rendering includes the 3D rendering of the physical object (previously generated) having the curve superposed thereon.

The 3D rendering device 108 outputs data representative of the augmented 3D rendering of the physical object to the display 110. The display 110 displays the augmented 3D rendering of the physical object. It is noted that detecting the spatial position of the input device 112, generating the augmented 3D rendering and outputting, to the display 110, the data representative of the augmented 3D rendering may be performed in real-time. Thus, the user viewing the display 110 sees the curve in the augmented 3D rendering in real-time and as the user "draws" using the input device 112 (or as the user uses the input device 112 to trace over the outer surface of the physical object 101). It is noted that the term "curve" is used herein to represent any general shape drawn by the user using the input device 112. The curve, for example, may be a straight line or any other shape.

In an embodiment, the tip 120 of the input device 112 may be pressure-sensitive. The input device 112 may sense the pressure applied to the tip by the user as the user operates the input device 112. The pressure may be used to determine a thickness of the curve drawn by the user. The input device 112 may output data representative of the pressure applied to the tip 120. The input device 112 may output the pressure data to the 3D rendering device 108. As described herein, the input device 112 may include a communication device (not shown) operable to communicate with the one or more communication devices 118 of the 3D rendering device 108 and operable to output a signal including the data representative of the pressure applied to the tip 120. The one or more communication devices 118 of the 3D rendering device 108 may receive the signal and output the data representative of the pressure to the processor 114. The processor 114 identifies the pressure based on the received pressure data. The processor 114 renders the curve with a line thickness that corresponds to the identified pressure. The relationship between the pressure and thickness may be proportional, whereby a greater amount of pressure applied by the user results in rendering a thicker curve.

The processor 114 may evaluate the identified pressure together with the position of the tip 120. The processor 114 generates the curve to be superposed onto the 3D rendering of the physical object based on both the pressure data and the position data. A thickness of the curve at a position in space corresponds to the identified pressure applied to the tip 120 at that position in space.

The plurality of control inputs 124*a-c* of the input device 112 may be used to control attributes of the curve. For example, a first control input 124*a* may be used to select between modes of operation of the input device 112. A first mode of operation may be augmentation of the 3D rendering as described herein, whereby one or more additional curves are superposed on the 3D rendering. A second mode of operation may be modification of the 3D rendering and a third mode of operation may be distance measurement as described herein. The user may operate the first control input 124*a*, which may be a multi-pole or a multiway switch, to select the mode of operation from various available modes of operation.

Similarly, the second and third control inputs 124*b*, 124*c* may be used to select attributes of the curve, such as color, style, or thickness of the line making the curve. In an embodiment, the second control input 124*b* may be used to select a color of the curve such as red, green or blue, among others, and/or a style of the curve such as a solid or dashed line curve, among others. In an embodiment, the third control input 124*c* may be used to select a static or constant thickness of the curve. The thickness selected using the third control input 124*c* may override or supersede the thickness determined based on pressure applied to the tip 120. In an embodiment, control input functionality may be user-configurable. For example, a user may specify a control input functionality respectively associated with the control inputs 124*a-c* that is different than a default control input functionality of the input device 112.

It is noted that input device 112 of FIG. 3 is exemplary and non-limiting. In various embodiments any other type of input device 112 may be used. The input device 112 may have a different form factor than that illustrated in FIG. 3. In an embodiment, the input device may be a joystick, touchpad, pressure-sensitive pad or wheel, among others. Further, the input device 112 may have more control inputs or fewer control inputs than illustrated in FIG. 3.

The input device 112 outputs, to the 3D rendering device 108, data representative of the selected mode of operation and/or attributes of the curve. The 3D rendering device 108 receives the data representative of the selected mode of operation and/or attributes of the curve and uses the data together with the data representative of the position of the tip 120 to generate the augmented 3D rendering of the physical object. For example, the 3D rendering device 108 may apply a color to the curve or render the curve to have a thickness that is in accordance with the received attributes.

In addition or as an alternative to augmenting the 3D rendering of the physical object 101, the 3D rendering device 108 may refine or change the 3D rendering of the physical object 101 based on user input provided using the input device 112. The user may use the input device to trace the outer surface of the physical object 101 in order to refine or change (and improve the accuracy of) the 3D rendering of the physical object. For example, the user may trace over the physical object 101 to provide precise positions of the tip 120 at or near the outer surface of the physical object 101. The positions of the tip 120 are then used to change the 3D rendering of the physical object 101 and improve the accuracy of the 3D rendering of the physical object 101.

As the user utilizes the input device 112 to trace the outer surface of the physical object 101, the tracking device 113 tracks the position of the tip. The tracking device 113 outputs data representative of the spatial position of the tip 120 to the 3D rendering device 108. The position may be a position in space represented in a Cartesian coordinate system of 3-dimensional space as three coordinates (for example, (x,y,z)) or represented in a Polar coordinate system as three coordinates (for example, radial distance, polar angle and azimuthal angle) in relation to a reference point (or a point of origin). The position tracking of the input device 112 may have more precise spatial resolution than the 3D scanner 102 that is otherwise used to generate the 3-dimensional model of the physical object, as described above with regard to FIGS. 1 and 2. The 3D rendering device 108 receives the data representing the tracked position of the tip 120 of the input device 112 and, using the tracked position data, adjusts or changes the 3D model that provides the 3D rendering of the physical object.

As described herein, the 3D rendering of the physical object may include a plurality of vertices, whereby each pair of vertices is connected by an edge of a plurality of edges. The 3D rendering device 108 may set the position of the tip 120 received from tracking device 113 as a vertex of the plurality of vertices. As such, the 3D rendering of the physical object is adjusted based on the data position received from the tracking device 113. Furthermore, the 3D rendering device 108 may remove an existing vertex of the 3D rendering and replace the removed vertex with a vertex at the received position of the input device 112. The removed vertex may be the vertex whose position in Euclidean space is closest to the received position of the input device 112. The 3D rendering device 108 may remove the vertex and replace with a new vertex whose position corresponds (or is identical) to the spatial position of the tip 120 received from the tracking device 113. Thus, the 3D rendering device 108 iteratively improves the 3D rendering of the physical object using tracked positional data of the input device 112 as the input device 112 traces portions of the surface of the physical object. Based on the adjustments made to the 3D model of the physical object, the 3D rendering device 108 generates an updated 3D rendering of the physical object 101 and outputs data representative of the updated 3D rendering to the display 110.

Thus, the 3D rendering device 108 initially generates a 3D model of the physical object 101 based on the data representative of the scanned physical object 101 output by the 3D scanner 102. Then, the 3D rendering device 108 refines the 3D model based on the data representative of the position of the input device 112 or tip 120 thereof as the input device 112 traces portions of the surface of the physical object. Accordingly, the 3D rendering device 108 incrementally improves the 3D rendering of the physical object.

In an embodiment, the system 106 may be used to measure distances in space. The distance, which may be Euclidean distance, may lie anywhere in space. The distance may, for example, between two points on an outer surface of the physical object 101. To measure distance, a user may place the tip 120 of the input device 112 at a first point and move the tip 120 along the surface of the physical object to a second point that is different from the first point.

When the tip 120 is at the first point, the tracking device 113 identifies a first spatial position of the tip and outputs the first position data to the 3D rendering device 108. The 3D rendering device 108 stores the first position data in the memory 116. The user then moves the tip 120 of the input device 112 along the surface of the physical object to the second point. The tracking device 113 identifies a second position associated with the second point in space. The tracking device 103 outputs the second position to the 3D rendering device 108. Having received the first and second positions, the 3D rendering device 108 determines the Euclidean distance between the first and second positions. The 3D rendering device 108 then outputs data indicative of the distance to the display 110 to be displayed to the user or to any other device that outputs the distance to the user.

It is noted that in various embodiments, the distance may be a linear distance between two points, such as the first and second points. In addition or alternatively, the distance may be a length of an arc or a curve traced by the tip 120 of the input device 112. As the user traces a curve, the tracking device 113 determines the spatial position of the tip 120 in real-time and outputs data representative of the position to the 3D rendering device 108. It is recognized that it may be advantageous for the user to trace a curve or an arc slowly to allow the tracking device 113 to determine various positions of the tip 120 in small distance increments in relation to each other and with greater granularity. Identifying the displacement of the tip 120 in smaller increments leads to improved accuracy in determining the length of a curve.

It is noted that in various embodiments, the tracking device 113 may be part of the 3D scanner 102 or the tracking device 113 may be dispensed with and the 3D scanner 102 may perform the tracking functions performed by the tracking device 113. Accordingly, the 3D scanner 102 may track the spatial position of the input device 112 and output data representative of the tracked position to the 3D rendering device 108. The tracking device 113 may be an outside-in tracking device in which cameras or other sensors at fixed locations and oriented towards the input device 112 track movement of the input device as it moves within the visual ranges of the cameras or other sensors. Furthermore, the tracking device 113 may be part of or included in the head-mounted display or the 3D rendering device 108. Alternatively or in addition, the display 110 may include inside-out tracking, whereby the display 110 may include a camera that "looks out" on or observes an external surrounding environment or space to determine a position of the display 110 or the input device 112 in relation to the environment or space.

Figure 4:
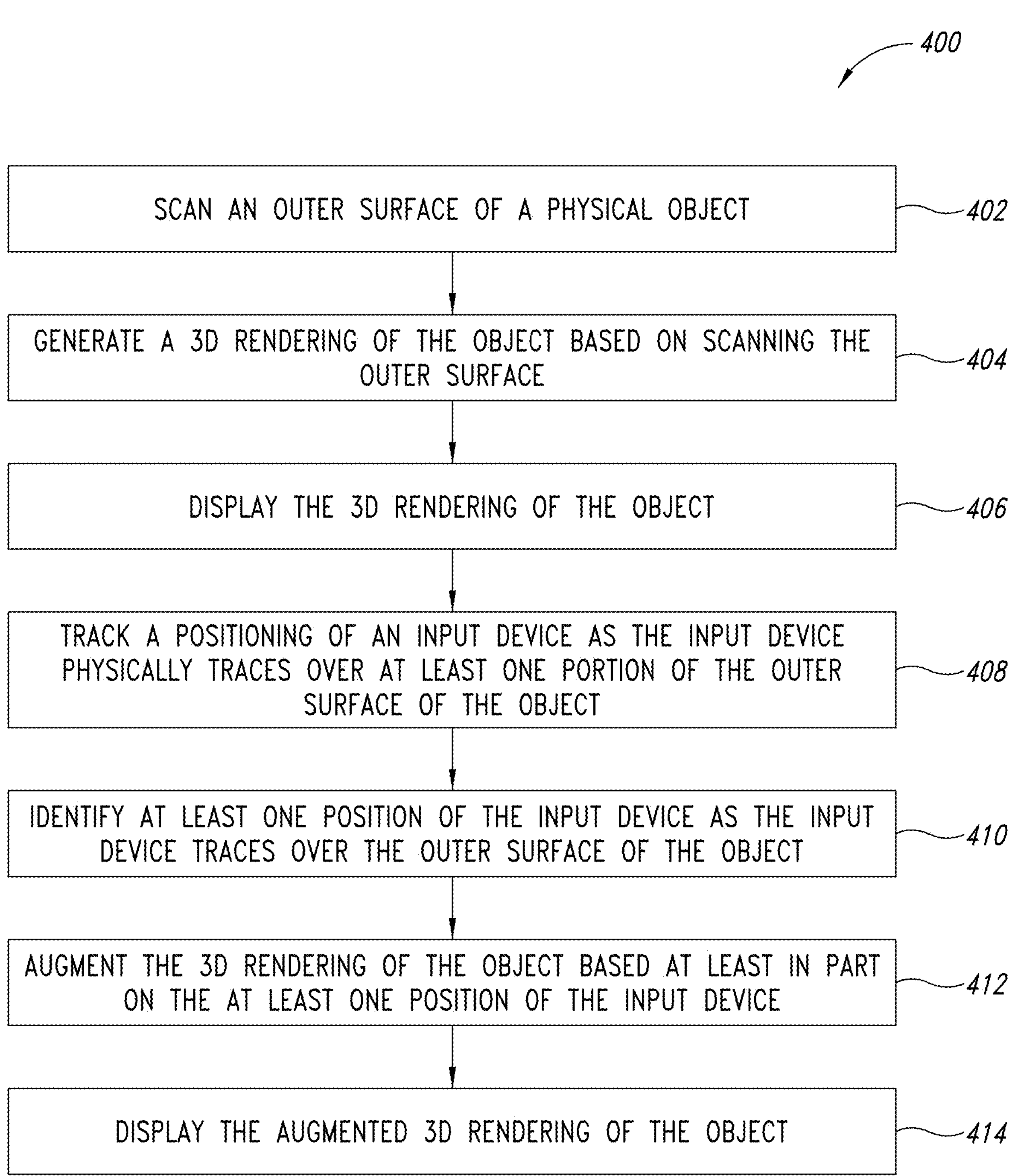
FIG. 4 shows a flow diagram of a method for augmenting a 3D rendering of an object.

FIG. 4 shows a flow diagram of a method 400 for augmenting a 3D rendering of an object. In the method 400, a 3D scanner, such as the 3D scanner 102 described with reference to FIG. 1, scans an outer surface of a physical object at 402. At 404, a 3D rendering device, such as the 3D rendering device 108 described with reference to FIG. 2, generates a 3D model of the object based on the data resulting from scanning the outer surface at 402. The 3D model of the object may include a plurality of vertices, a plurality of edges, and a plurality of surfaces determined from the 3D scanning of the outer surface of the object.

At 406, a display, such as the display 110 described with reference to FIG. 2, displays a 3D rendering of the physical object based on the generated 3D model. The display may be a virtual reality (VR) or an augmented reality (AR) display. The physical object may be transparently visible through the display. The display may superpose the 3D rendering over the physical object that is otherwise visible through the display. At 408, a tracking device, such as the tracking device 113 described with reference to FIG. 2, tracks a positioning of an input device as the input device physically traces over at least one portion of the outer surface of the object. At 410, the tracking device identifies at least one spatial position of the input device as the input device traces over the outer surface of the object.

At 412, the 3D rendering device augments the 3D rendering of the object based at least in part on the tracked position or positions of the input device. A user may physically trace the input device over a portion of an outer surface of the physical object to draw a curve or any shape. The tracking device tracks the input device as the user physically traces the input device over the outer surface of the physical object. Data representing the spatial position of the input device is provided to the 3D rendering device, which uses the data to determine the shape of the curve as well as the position of the curve in relation to the 3D rendering of the object. The 3D rendering device augments the 3D rendering to include a rendering of the curve. The display displays the augmented 3D rendering of the object at 414.

Figure 5:
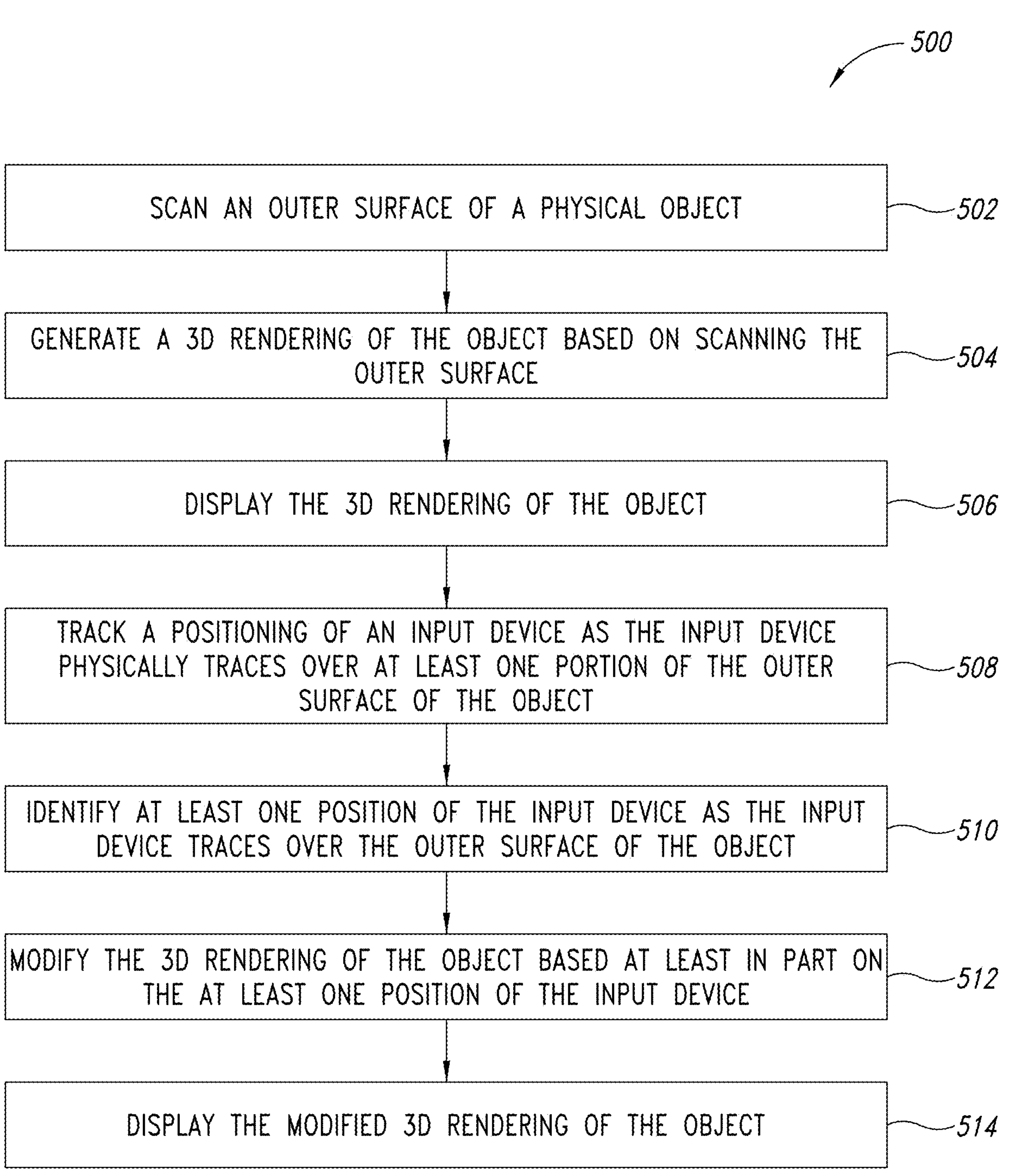
FIG. 5 shows a flow diagram of a method for modifying a 3D rendering of an object based on a position of an input device.

FIG. 5 shows a flow diagram of a method 500 for modifying a 3D rendering of an object based on a tracked position of an input device. Steps 502, 504, 506, 508 and 510 of the method 500 are similar to steps 402, 404, 406, 408 and 410 of the method 400 described with reference to FIG. 4. The method 500 includes scanning an outer surface of a physical object at 502, generating a 3D model of the object at 504 based on the scanning of the outer surface and displaying at 506 a 3D rendering of the object based on the generated 3D model. The method 500 also includes tracking at 508 a positioning of an input device as the input device physically traces over at least one portion of the outer surface of the object and identifying at 510 at least one spatial position of the input device as the input device traces over the outer surface of the object.

The user may physically trace the input device over the surface of the physical object in order to provide more precise physical coordinates of the surface of the physical object. By tracing the input device over or positioning the input device at the surface of the physical object while the input device is being tracked, the user effectively provides the positioning (or the coordinates) of the surface. The more precise data reflecting the positioning of the surface can be used to modify and enhance the 3D rendering of the physical object (for example, in the event that the 3D scanning of the object is inaccurate).

Thus, as opposed to augmenting the 3D rendering, the method 500 proceeds to modifying at 512, by the 3D rendering device, the 3D model of the object based at least in part on the tracked position or positions of the input device. The tracked spatial position of the input device is used to refine or enhance the accuracy of the 3D model of the object rather than augment or add to the 3D rendering. As described herein, the position of the input device may be included as a vertex in the modified 3D model of the object. Following modifying the 3D model of the object, the display displays at 514 an updated 3D rendering of the object based on the modified 3D model of the object.

Figure 6:
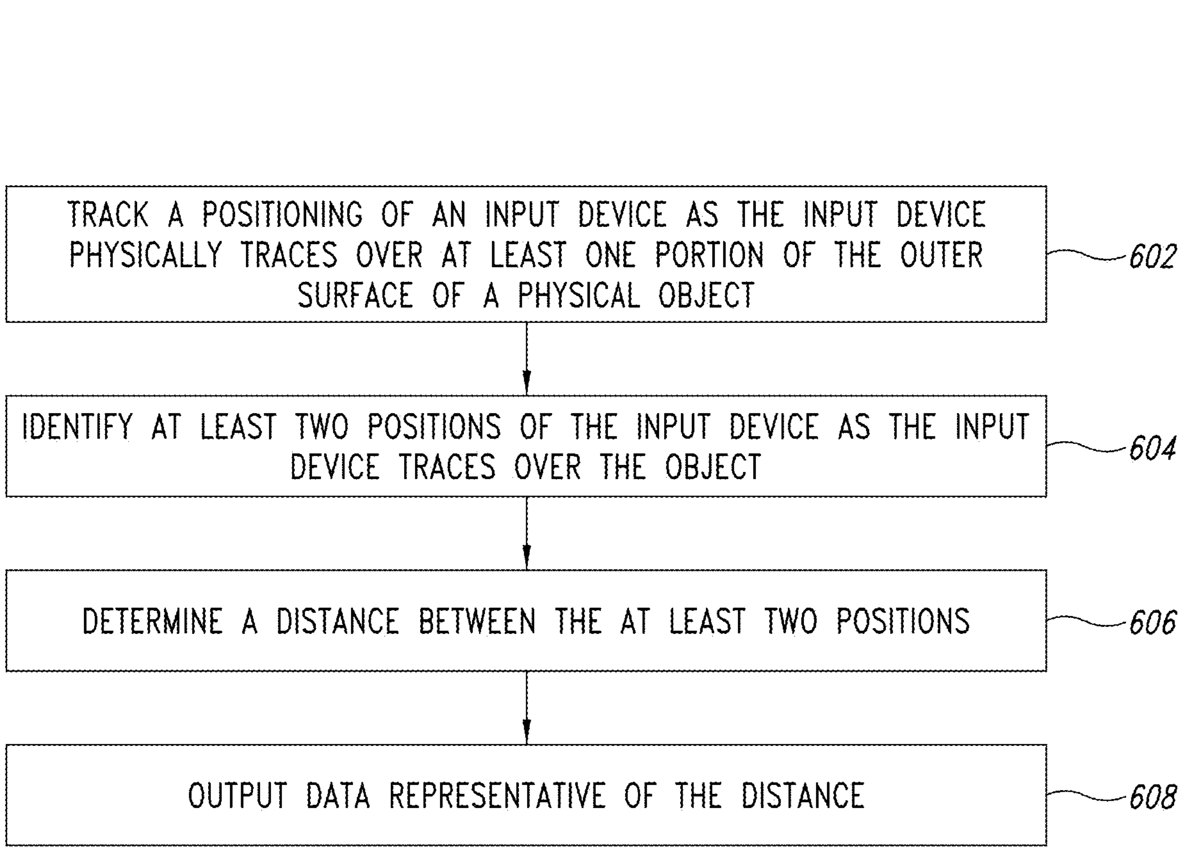
FIG. 6 shows a flow diagram of a method for distance measurement based on a position of an input device.

FIG. 6 shows a flow diagram of a method 600 for distance measurement based on a tracked position or positions of an input device. In the method 600, a tracking device tracks, at 602, a spatial positioning of an input device as the input device traces over the at least one portion of an outer surface of a physical object. The user may trace over the outer surface of the physical object to measure a distance between two points or positions along the outer surface of the physical object. The tracking device identifies, at 604, the at least two positions of the input device as the input device traces over the object.

The 3D rendering device determines a distance between the at least two positions at 606. The distance may be a Euclidean distance between the at least two positions. The distance may be a linear distance along a straight line or a distance along a curve traversed by the input device. The curve traversed by the input device may be approximated by a plurality of short line segments extending between multiple sensed positions of the input device as the input device traversed the curve. The distance along the curve may be determined by summing individual distances of the short line segments. The 3D rendering device outputs data representative of the distance at 608, which may be displayed on the display.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system, comprising:

an input device that, in operation, physically traces over at least one portion of an outer surface of a physical object, wherein the input device includes a housing and a control input on the housing which, in operation, selects a curve attribute that is configured by a user of the system; and a tracking device that, in operation, tracks a positioning of the input device as the input device physically traces over the at least one portion of the outer surface of the physical object, and outputs data representative of a plurality of positions of the input device as the input device physically traces over the at least one portion of the outer surface of the physical object; and a processor that, in operation, receives the data representative of the plurality of positions of the input device, augments a three-dimensional (3D) rendering of the physical object based at least in part on one or more curves corresponding to the data representative of the plurality of positions of the input device and the curve attribute selected by the control input on the housing of the input device, and outputs an augmented 3D rendering of the physical object to a display in response to the control input on the housing of the input device selecting the curve attribute that is configured by the user of the system.

2. The system of claim 1, wherein the processor, in operation, augments the 3D rendering of the physical object by at least:

identifying, based on the data representative of the plurality of positions of the input device, the one or more curves respectively having one or more positions in space relative to the outer surface of the physical object; and superposing the one or more curves on the 3D rendering of the physical object at one or more rendering positions corresponding to the one or more positions in space relative to the outer surface of the physical object, respectively.

3. The system of claim 2, wherein the input device is pressure sensitive and wherein the input device, in operation, senses a pressure applied to the input device as the input device physically traces over the at least one portion of the outer surface of the physical object, and outputs data representative of the pressure, and wherein the processor, in operation:

determines respective one or more widths of the one or more curves based at least in part on the pressure applied to the input device as the input device physically traces over the at least one portion of the outer surface of the physical object to form the one or more curves; and superposes, on the 3D rendering of the physical object, the one or more curves having the respective one or more widths.

4. The system of claim 2, wherein the control input, in operation, selects a constant thickness of the one or more curves, and the processor, in operation, determines respective one or more widths of the one or more curves as the constant thickness selected by the control input of the input device regardless of pressure applied to the input device.

5. The system of claim 2, wherein the control input, in operation, receives one or more respective width indications of the one or more curves, wherein the input device, in operation, outputs data representative of one or more respective width indications to the processor, and wherein the processor, in operation:

receives the data representative of one or more respective width indications;

determines respective one or more widths of the one or more curves based the data representative of one or more respective width indications; and superposes, on the 3D rendering of the physical object, the one or more curves having the respective one or more widths.

6. The system of claim 1, further comprising:

a head-mounted display configured to display the 3D rendering of the physical object superposed on the physical object that otherwise is visually visible through the head-mounted display.

7. The system of claim 1, wherein the curve attribute indicates a dashed line curve.

8. A method, comprising:

receiving data representative of a plurality of positions of an input device from a tracking device, the input device physically tracing over at least one portion of an outer surface of a physical object, wherein the input device includes a housing and a control input on the housing which selects a curve attribute that is configured by a user of the input device, the tracking device tracking a positioning of the input device as the input device physically traces over the at least one portion of the outer surface of the physical object, and outputting data representative of a plurality of positions of the input device as the input device physically traces over the at least one portion of the outer surface of the physical object;

augmenting a three-dimensional (3D) rendering of the physical object based at least in part on one or more curves corresponding to the data representative of the plurality of positions of the input device and the curve attribute selected by the control input on the housing of the input device, and outputting an augmented 3D rendering of the physical object to a display in response to the control input on the housing of the input device selecting the curve attribute that is configured by the user of the input device.

9. The method of claim 8, wherein the augmenting includes:

identifying, based on the data representative of the plurality of positions of the input device, the one or more curves respectively having one or more positions in space relative to the outer surface of the physical object; and superposing the one or more curves on the 3D rendering of the physical object at one or more rendering positions corresponding to the one or more positions in space relative to the outer surface of the physical object, respectively.

10. The method of claim 9, wherein the input device is pressure sensitive and wherein the input device senses a pressure applied to the input device as the input device physically traces over the at least one portion of the outer surface of the physical object, and outputs data representative of the pressure, and wherein the method further comprises:

determining respective one or more widths of the one or more curves based at least in part on the pressure applied to the input device as the input device physically traces over the at least one portion of the outer surface of the physical object to form the one or more curves; and superposing, on the 3D rendering of the physical object, the one or more curves having the respective one or more widths.

11. The method of claim 9, wherein the control input selects a constant thickness of the one or more curves, and wherein the method further comprises:

determining respective one or more widths of the one or more curves as the constant thickness selected by the control input of the input device regardless of pressure applied to the input device.

12. The method of claim 9, wherein the control input receives one or more respective width indications of the one or more curves, wherein the input device outputs data representative of one or more respective width indications, and wherein the method further comprises:

receiving the data representative of one or more respective width indications;

determining respective one or more widths of the one or more curves based the data representative of one or more respective width indications; and superposing, on the 3D rendering of the physical object, the one or more curves having the respective one or more widths.

13. The method of claim 8, wherein the display is a head-mounted display that displays the 3D rendering of the physical object superposed on the physical object that otherwise is visually visible through the head-mounted display.

14. The method of claim 8, wherein the curve attribute indicates a dashed line curve.

* * * * *